(12) United States Patent
Tembreull et al.

(10) Patent No.: US 9,863,520 B2
(45) Date of Patent: Jan. 9, 2018

(54) FAN DRIVE HUB ASSEMBLY WITH MODULAR INPUT SHAFT ASSEMBLY

(71) Applicant: BorgWarner Inc., Auburn Hills, MI (US)

(72) Inventors: Vincent M. Tembreull, Cadillac, MI (US); Jason R. Roderick, Cadillac, MI (US); Robert A. Papenfuss, Kaleva, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/283,985

(22) Filed: Oct. 3, 2016

(65) Prior Publication Data

US 2017/0138459 A1 May 18, 2017

Related U.S. Application Data

(60) Provisional application No. 62/256,780, filed on Nov. 18, 2015.

(51) Int. Cl.
*F16H 7/20* (2006.01)
*F16H 55/36* (2006.01)
*F16H 57/00* (2012.01)
*F16D 1/076* (2006.01)
*F16D 1/02* (2006.01)

(52) U.S. Cl.
CPC ........... *F16H 57/0025* (2013.01); *F16D 1/02* (2013.01); *F16D 1/076* (2013.01); *F16H 55/36* (2013.01)

(58) Field of Classification Search
CPC .. F16H 55/36; F16H 55/44; F01P 5/02; B23P 15/00; F02B 67/06
USPC .......................................................... 474/199
See application file for complete search history.

(56) References Cited

U.S. PATENT DOCUMENTS

| | | | | |
|---|---|---|---|---|
| 1,384,155 A | * | 7/1921 | Rossoe | F01P 5/02 416/169 A |
| 1,960,282 A | * | 5/1934 | Walker | F01P 5/02 415/143 |
| 2,546,782 A | * | 3/1951 | Rives | F16H 55/44 474/168 |
| 3,430,743 A | * | 3/1969 | Fujita | F16D 35/00 123/41.11 |
| 3,444,748 A | * | 5/1969 | Sutaruk | F01P 7/042 192/45.004 |
| 3,757,914 A | * | 9/1973 | Elmer | F16D 47/06 192/48.3 |
| 4,064,980 A | * | 12/1977 | Tinholt | F16D 35/023 123/41.12 |
| 4,074,662 A | * | 2/1978 | Estes | F01P 7/084 123/41.12 |
| 4,254,541 A | * | 3/1981 | St. John | B23P 11/00 192/107 T |
| 4,402,678 A | * | 9/1983 | St. John | B23P 11/00 474/171 |
| 4,463,275 A | * | 7/1984 | Ragaly | F16D 7/005 310/68 D |

(Continued)

*Primary Examiner* — Henry Liu
(74) *Attorney, Agent, or Firm* — Harness, Dickey & Pierce, P.L.C.

(57) ABSTRACT

A fan drive hub assembly having a modular input shaft assembly that includes a rear bearing housing, a front bearing housing, and a coupler that is fixedly coupled to the rear and front bearing housings.

11 Claims, 12 Drawing Sheets

(56) References Cited

U.S. PATENT DOCUMENTS

| | | | | |
|---|---|---|---|---|
| 4,476,405 A * | 10/1984 | Komurasaki | H02K 9/06 | 310/60 R |
| 4,476,744 A * | 10/1984 | Crooks | F01P 7/046 | 192/12 B |
| 4,534,749 A * | 8/1985 | Hans | F16C 13/006 | 474/174 |
| 4,544,054 A * | 10/1985 | Brown | F16D 1/0847 | 192/58.4 |
| 4,591,037 A * | 5/1986 | Bopp | F01P 7/042 | 192/58.61 |
| 4,648,163 A * | 3/1987 | Kayakabe | B21D 53/261 | 29/892.11 |
| 5,022,507 A * | 6/1991 | Kennedy | F16D 35/023 | 192/58.682 |
| 5,022,821 A * | 6/1991 | Isert | F04D 29/362 | 416/157 R |
| 5,101,950 A * | 4/1992 | Schoenmeyer | F16D 35/023 | 123/41.12 |
| 5,122,034 A * | 6/1992 | Isert | F04D 29/362 | 416/157 R |
| 5,191,813 A * | 3/1993 | Havens | B60K 17/105 | 60/487 |
| 5,523,638 A * | 6/1996 | Albrecht | H01R 39/646 | 310/105 |
| 5,899,176 A * | 5/1999 | Kern | F01P 5/04 | 123/41.46 |
| 5,931,755 A * | 8/1999 | Mailey | B29C 45/0005 | 474/161 |
| 6,010,420 A * | 1/2000 | Niki | F02B 67/06 | 384/475 |
| 6,370,776 B1 * | 4/2002 | Kanemitsu | B21D 53/261 | 29/892 |
| 7,100,544 B1 | 9/2006 | Wayman | | |
| 7,108,623 B2 * | 9/2006 | Cadarette | F16H 55/36 | 474/166 |
| 7,364,025 B2 | 4/2008 | Robb et al. | | |
| 7,597,070 B2 * | 10/2009 | Krolewski | F01P 5/04 | 123/41.11 |
| 9,506,507 B2 * | 11/2016 | Savela | F16D 35/02 | |
| 2003/0008743 A1 * | 1/2003 | Cadarette | F16H 55/36 | 474/199 |
| 2006/0096831 A1 * | 5/2006 | Settineri | F16D 25/123 | 192/66.2 |
| 2012/0164002 A1 * | 6/2012 | Roczniak | F04D 25/022 | 417/319 |
| 2016/0116050 A1 * | 4/2016 | Arnault | F16C 19/166 | 474/199 |

* cited by examiner

FAN DRIVE HUB ASSEMBLY WITH MODULAR INPUT SHAFT ASSEMBLY

CROSS-REFERENCE TO RELATED APPLICATIONS

This application claims the benefit of U.S. Provisional Application Ser. No. 62/256,780 filed Nov. 18, 2015, the disclosure of which is incorporated by reference as if fully set forth in detail herein.

FIELD

The present disclosure relates to a fan drive hub assembly with a modular input shaft assembly.

BACKGROUND

This section provides background information related to the present disclosure which is not necessarily prior art.

Fan drive hub assemblies for medium and heavy-duty vehicles, such as Class 8 on-highway trucks, frequently employ a one-piece input shaft that is formed of cast iron and often times is unitarily and integrally formed with a pulley. Construction of the input shaft in this manner is robust input shaft but extremely heavy. Moreover, such input shafts are typically specific to a particular model of fan drive hub assembly (e.g., mounting length). Accordingly, there remains a need in the art for a fan drive hub assembly having a robust yet lighter weight input shaft assembly that is relatively easy to manufacture. Additionally there remains a need in the art for a modular input shaft assembly having components that can be used across multiple fan drive hub assembly models.

SUMMARY

This section provides a general summary of the disclosure, and is not a comprehensive disclosure of its full scope or all of its features.

In one form, the present disclosure provides a fan drive hub assembly that includes an output member, a input shaft, a clutch, which selectively transmits rotary power between the input shaft and the output member, an input member coupled to the input shaft for common rotation, a base shaft received in the input shaft, and first and second shaft bearings that support the input shaft for rotation on the base shaft. The input shaft includes a rear bearing housing, a front bearing housing and a coupler. The rear bearing housing has a first body and a first flange that extends radially outwardly from the first body. The first body is a tubular structure that defines a first bearing seat, which receives the first shaft bearing, a first threaded portion, and a first shoulder. The first threaded portion is formed on an axial end of the first body. The input member is fixedly coupled to the first flange. The front bearing housing has a second body and a second flange that extends radially outwardly from the second body. The second body is a tubular structure that defines a second bearing seat, which receives the second shaft bearing, a second threaded portion, and a second shoulder. The second threaded portion is formed on an axial end of the second body. An input of the clutch is coupled to the second flange for common rotation. The coupler is a tubular structure having third and fourth threaded portions and first and second abutment faces. The third threaded portion is threadably engaged to the first threaded portion. The fourth threaded portion is threadably engaged to the second threaded portion. The first abutment face is abutted against the first shoulder and the second abutment face is abutted against the second shoulder.

In another form, the present disclosure provides a fan drive hub assembly that includes an output member, a input shaft, a clutch that selectively transmits rotary power between the input shaft and the output member, an input member coupled to the input shaft for common rotation, a base shaft received in the input shaft, and first and second shaft bearings that support the input shaft for rotation on the base shaft. The input shaft comprises a rear bearing housing, a front bearing housing and a coupler. The rear bearing housing has a first body and a first flange that extends radially outwardly from the first body. The first body is a tubular structure that defines a first bearing seat, which receives the first shaft bearing, and a first coupling section. The input member is fixedly coupled to the first flange. The front bearing housing has a second body and a second flange that extends radially outwardly from the second body. The second body is a tubular structure that defines a second bearing seat, which receives the second shaft bearing, and a second coupling section. An input of the clutch is coupled to the second flange for common rotation. The coupler is a tubular structure having third and fourth coupling sections that are fixedly coupled to the first and second coupling sections, respectively.

In still another form, the present disclosure provides a fan drive hub assembly having a modular input shaft assembly that includes two individual bearing housings that are connected via a coupler. The axial length of the coupler can be varied as desired depending on various design criteria, including drive mounting-to-mounting length. The modular input shaft assembly includes an input member, such as a pulley, that can be assembled to or integrally formed with one of the individual bearing housings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
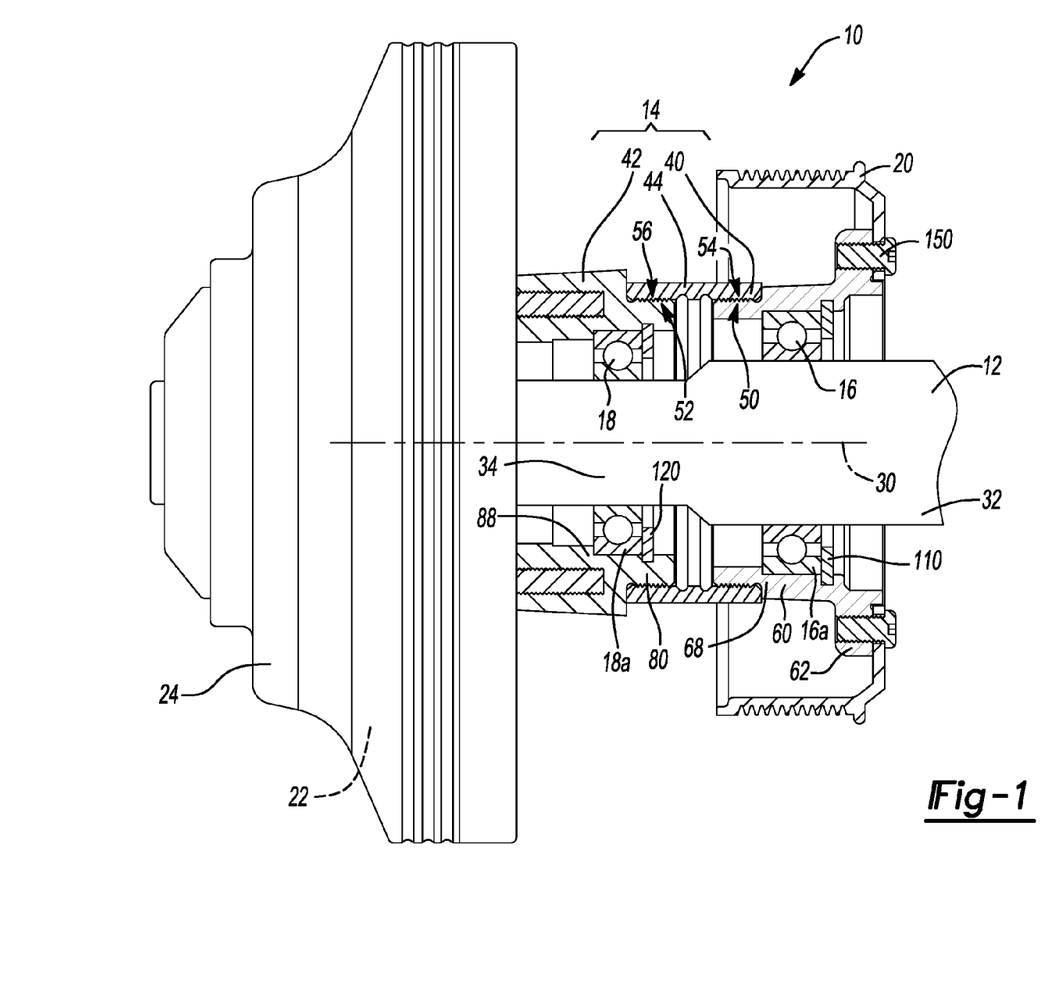
FIG. 1 is a partly sectioned side elevation view of a fan drive hub assembly constructed in accordance with the teachings of the present disclosure.

With reference to FIG. 1, a fan drive hub assembly constructed in accordance with the teachings of the present disclosure is generally indicated by reference numeral 10. The fan drive hub assembly 10 can include a base shaft 12, an input shaft 14, first and second shaft bearings 16 and 18, an input member 20, a clutch 22 and an output member 24.

The base shaft 12, which is only partly shown, is configured to be fixedly coupled to a structure, such an internal combustion engine (not shown) and supports the input shaft 14, and optionally the clutch 22, for rotation about a rotary axis 30. In the particular example provided, the base shaft 12 comprises a first cylindrical portion 32 and a second cylindrical portion 34.

The input shaft 14 can include a rear bearing housing 40, a front bearing housing 42 and a coupler 44 that can fixedly couple the rear bearing housing 40 and the front bearing housing 42 together. Generally speaking, the rear bearing housing 40 can have a first coupling section 50, the front bearing housing 42 can have a second coupling section 52, and the coupler 44 can have a third coupling section 54, which can be engaged or coupled to the first coupling section 50, and a fourth coupling section 56 that can be engaged or coupled to the second coupling section 52. Various techniques can be employed to fix associated coupling sections to one another, such as threads, fasteners, welds, etc. In the particular example provided, threads are employed to join and secure the associated coupling sections to one another. It will be appreciated that various techniques could be employed to locate the coupler 44 to the rear and front bearing housings 40 and 42 about the rotary axis 30 (i.e., concentrically with a runout that is less than or equal to a predetermined amount), including sets of dowel or roll pins (not shown) and that such techniques may be desirable when securing the components of the input shaft 14 to one another via techniques such as fasteners or welds.

Figure 2:
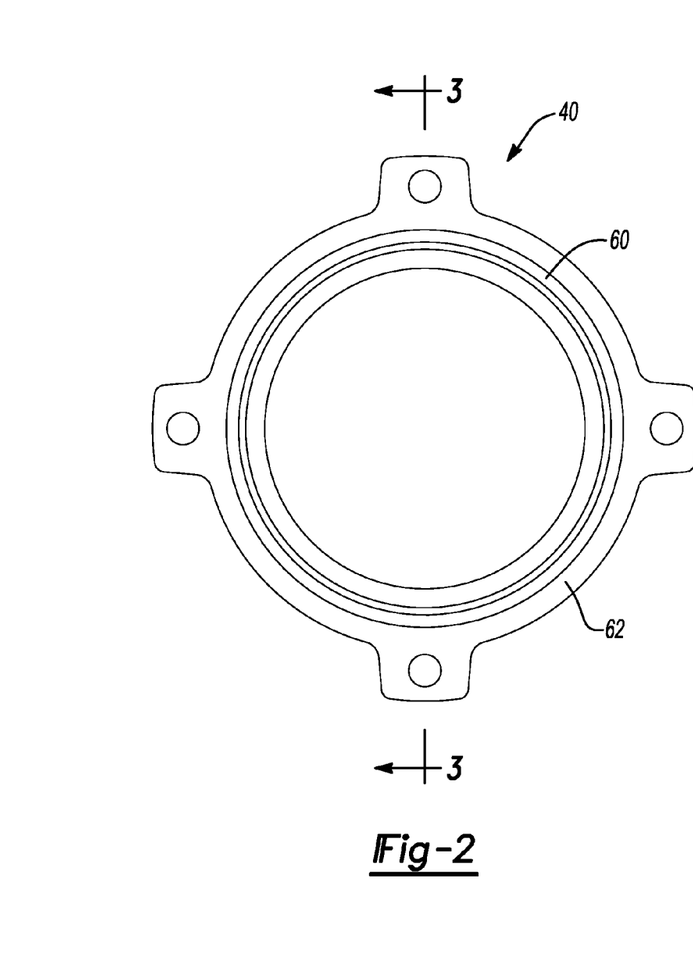
FIG. 2 is an end view of a portion of the fan drive hub assembly of FIG. 1, illustrating a rear bearing housing of a input shaft in more detail.
Figure 3:
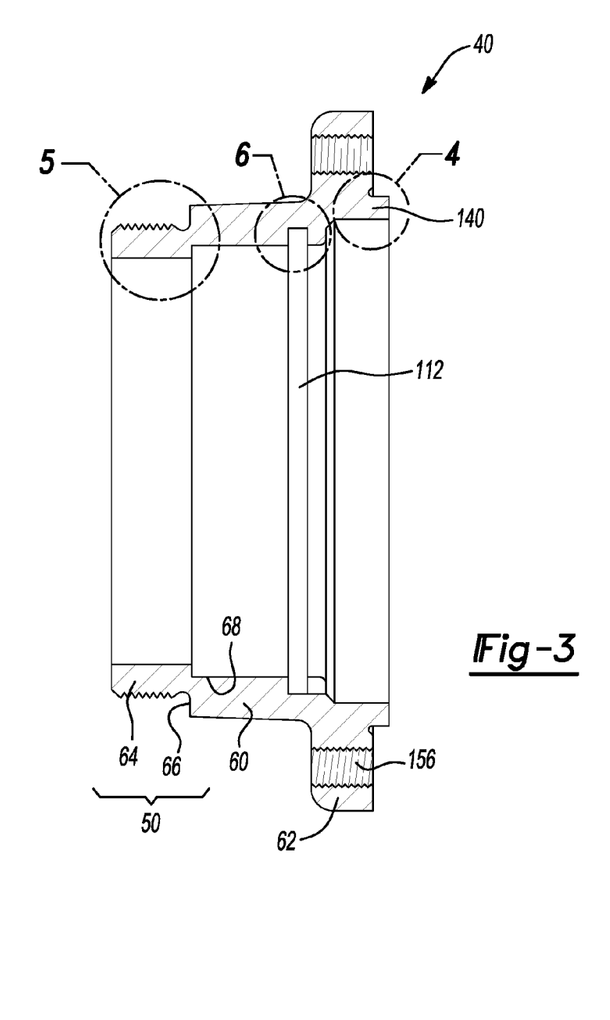
FIG. 3 is a section view taken along the line 3-3 of FIG. 2.
Figure 5:
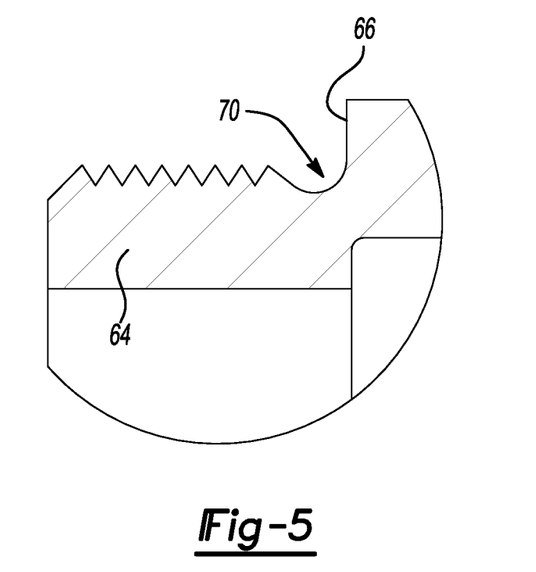

With reference to FIGS. 2 and 3, the rear bearing housing 40 can have a first body 60 and a first flange 62 that can extend radially from the first body 60. The first body 60 can be a tubular structure that can define a first threaded portion 64, a first shoulder 66, and a first bearing seat 68. The first threaded portion 64 and the first shoulder 66 can comprise the first coupling section 50 in the particular example provided. The first threaded portion 64 can be formed with threads of any desired form and could be external or internal threads. In the particular example provided, the first threaded portion 64 is formed with external left-handed buttress threads. The first shoulder 66 can extend from the first threaded portion 64 in a radial direction. If desired, an undercut radius 70 (FIG. 5) can be employed between the first threaded portion 64 and the first shoulder 66 as is shown in FIG. 5. The first bearing seat 68 can be a cylindrical bore that is configured to receive an outer bearing race 16a (FIG. 1) of the first shaft bearing 16 (FIG. 1). The first flange 62 can extend circumferentially about the first body 60 in a continuous manner or in an intermediate manner. In the particular example provided, the first flange 62 extends circumferentially about the first body 60 in a continuous manner and includes a plurality of mounting bosses or lugs that are spaced circumferentially apart from one another as shown in FIG. 2 as a way to reduce the mass of the rear bearing housing 40.

Figure 7:
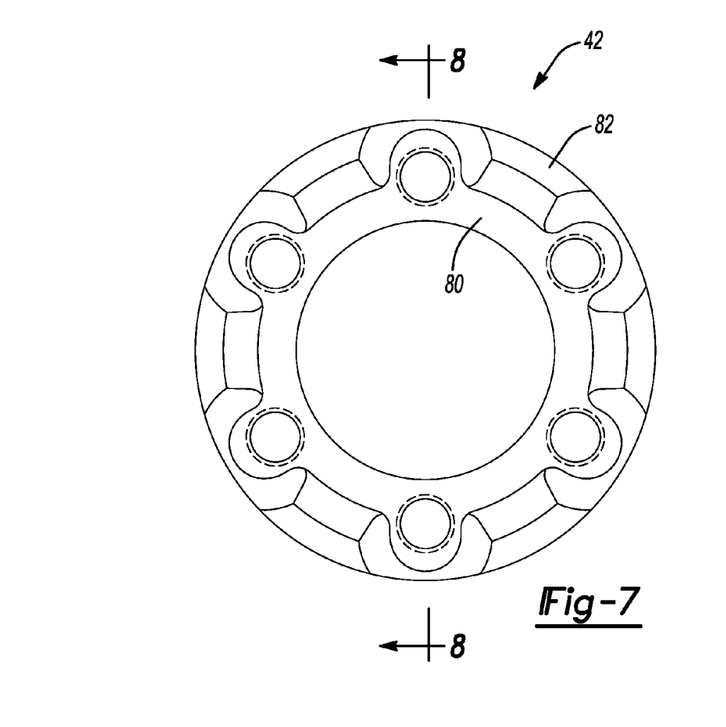
FIG. 7 is an end view of a portion of the fan drive hub assembly of FIG. 1, illustrating a front bearing housing of the input shaft in more detail.
Figures 8, 9:
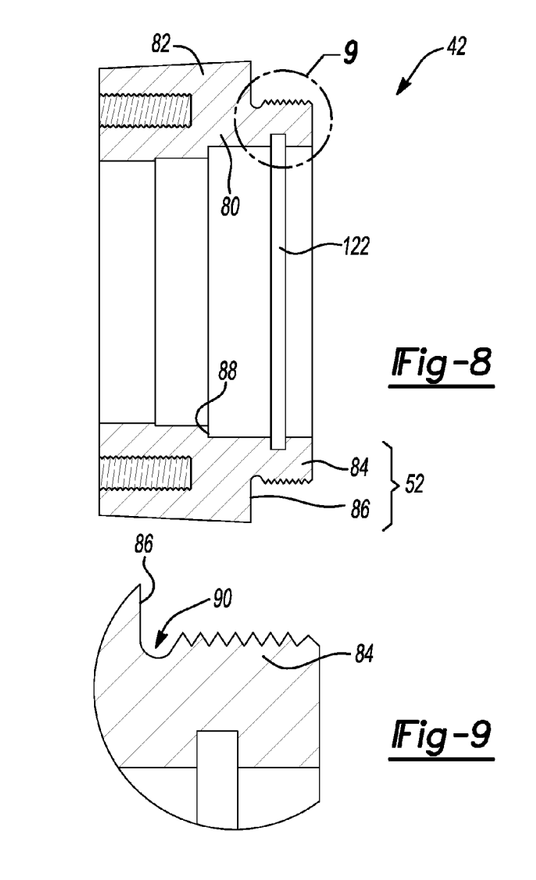
FIG. 8 is a section view taken along the line 8-8 of FIG. 7.
FIG. 9 is an enlarged portion of FIG. 8.

With reference to FIGS. 7 through 9, the front bearing housing 42 can have a second body 80 and a second flange 82 that can extend radially from the second body 80. The second body 80 can be a tubular structure that can define a second threaded portion 84, a second shoulder 86, and a second bearing seat 88. The second threaded portion 84 and the second shoulder 86 can comprise the second coupling section 52 in the particular example provided. The second threaded portion 84 can be formed with threads of any desired form and could be external or internal threads. In the particular example provided, the second threaded portion 84 is formed with external left-handed buttress threads. The second shoulder 86 can extend from the second threaded portion 84 in a radial direction. If desired, an undercut radius 90 (FIG. 9) can be employed between the second threaded portion 84 and the second shoulder 86. The second bearing seat 88 can be a cylindrical bore that is configured to receive an outer bearing race 18a (FIG. 1) of the second shaft bearing 18 (FIG. 1). The second flange 82 can extend circumferentially about the second body 80 in an intermediate manner (i.e., in the form of several circumferentially spaced apart flange segments—not shown) or in a continuous manner as shown in FIG. 7.

Figure 10:
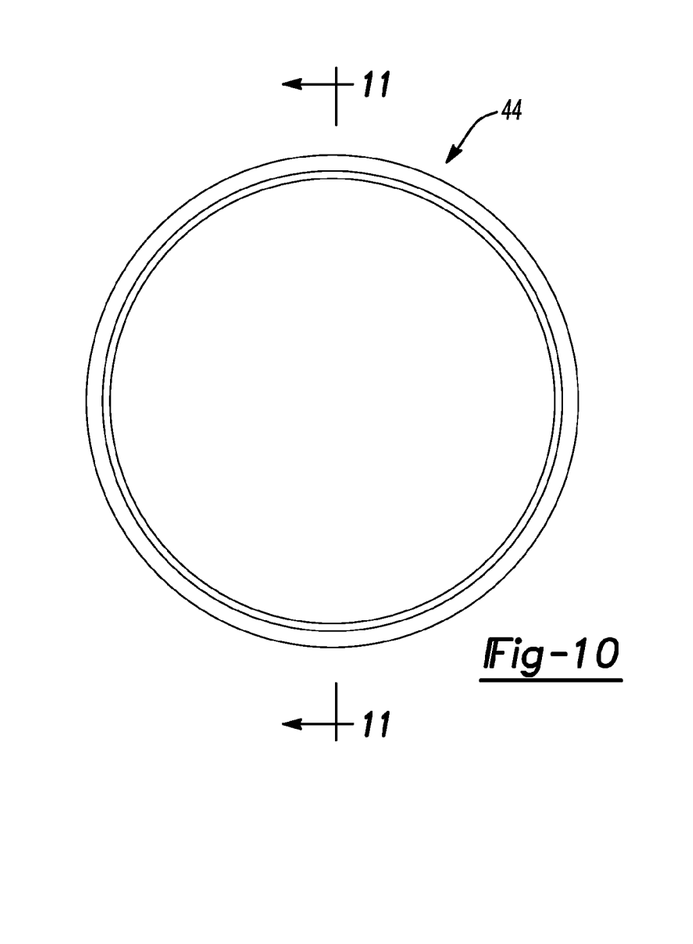
FIG. 10 is an end view of a portion of the fan drive hub assembly of FIG. 1, illustrating a coupler of the input shaft in more detail.
Figure 11:
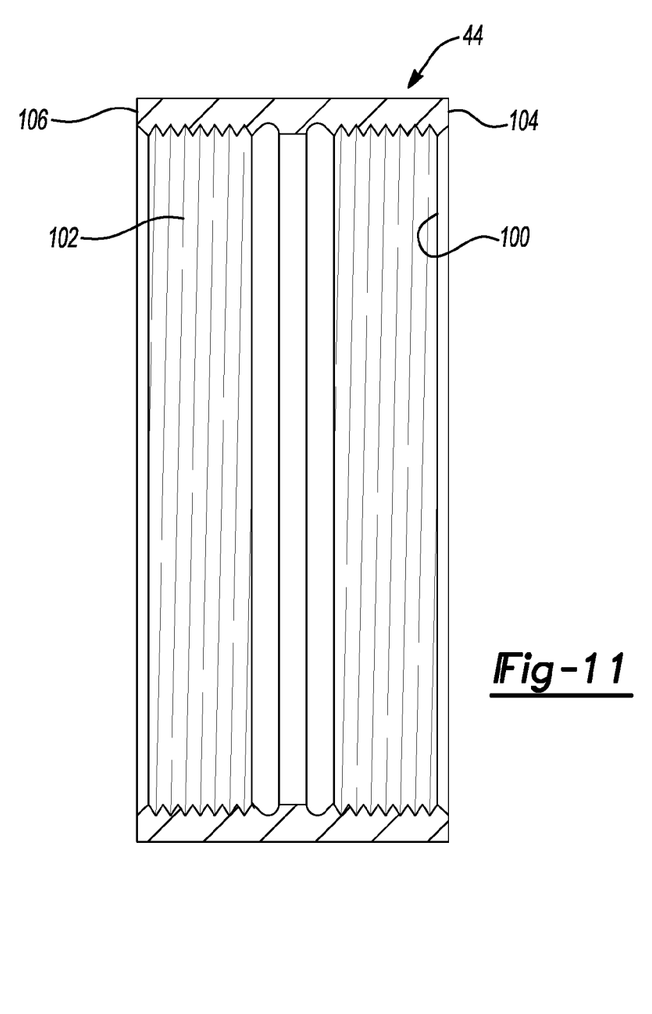
FIG. 11 is a section view taken along the line 11-11 of FIG. 10.
Figure 14:
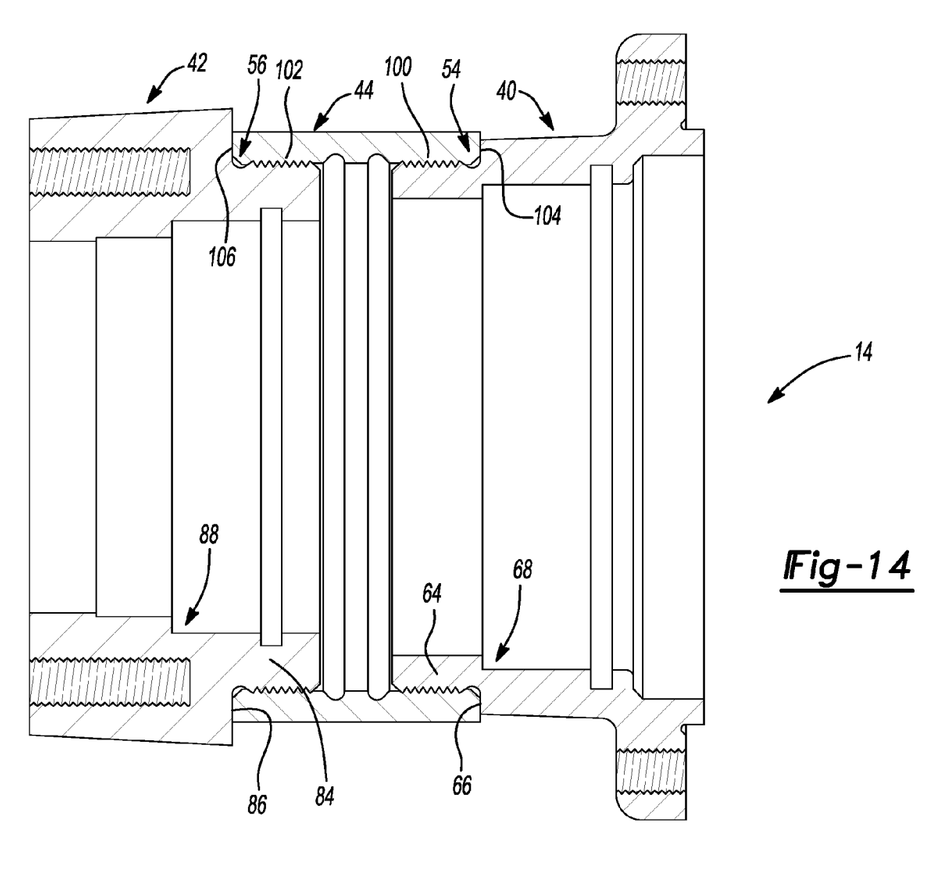
FIG. 14 is a longitudinal section view of the input shaft that is shown in FIG. 1.

With reference to FIGS. 10, 11 and 14, the coupler 44 can be a hollow, tubular structure that can comprise third and fourth threaded portions 100 and 102, respectively, and first and second abutment faces 104 and 106, respectively. The third threaded portion 100 and the first abutment face 104 can comprise the third coupling section 54, while the fourth threaded portion 102 and the second abutment face 106 can comprise the fourth coupling section 56. The third threaded portion 100 can be threadably engaged to the first threaded portion 64 on the rear bearing housing 40 and as such, can be formed with a complementary or mating thread form, such as internal left-handed buttress threads in the example provided. The coupler 44 can be tightened on the first body 60 of the rear bearing housing 40 in a desired manner (e.g., to a value that is greater than or equal to a predetermined minimum torque) and the first abutment face 104 can be abutted against the first shoulder 66. The fourth threaded portion 102 can be threadably engaged to the second threaded portion 84 on the front bearing housing 42 and as such, can be formed with a complementary or mating thread form, such as internal left-handed buttress threads in the example provided. The coupler 44 can be tightened on the second body 80 of the front bearing housing 42 in a desired manner (e.g., to a value that is greater than or equal to a predetermined minimum torque) and the second abutment face 106 can be abutted against the second shoulder 86. In the particular example provided, the several threaded portions are primarily configured to locate concentrically about the rotary axis, transmit axial (clamp) load that is generated as the several components are tightened against one another and protect against the ingress of dust and debris into the interior of the input shaft 14. Configuration in this manner eliminates the need for the first and second shaft bearings 16 and 18 to be sealed bearings, which can reduce their cost. In some situations, it may be necessary or desirable that the several components be sealed to one another and as such, the use of various sealants between the mating threads and/or gaskets (e.g., between the shoulders and abutment faces) is expressly contemplated.

With specific reference to FIG. 14, the rear and front bearing housings 40 and 42 and the coupler 44 can be threaded to one another by hand, installed to a holding fixture (not shown) and one of the rear and front bearing housings 40 and 42 can be rotated relative to the remaining portion of the input shaft 14 to tighten the components of the input shaft 14. Thereafter, the input shaft 14 can be rotationally balanced as needed. Any rotational balancing technique can be employed, including drilling, balance weights (e.g., balance tape, clips). It may be desirable in some instances to finish machine the input shaft 14 after it has been assembled. For example, finish stock can be left on the interior surface of one or both of the rear and front bearing housings 40 and 42, such as in the area where the first and second bearing seats 68 and 88 are located. In the particular example provided, the rear bearing housing 40 is finished machined prior to assembly with the front bearing housing 42 and finish stock is left only on the front bearing housing 42. Configuration in this manner permits first bearing seat 68 to be employed to locate (e.g., chuck) the assembly for finish machining of the front bearing housing 42. It will be appreciated that finish machining of all or parts of the assembly after the rear and front bearing housings 40 and 42 have been assembled to the coupler 44 can improve the rotational balance and reduce runout of the input shaft 14 as compared to an assembly where each of the components is finished machined prior to assembly.

Figure 6:
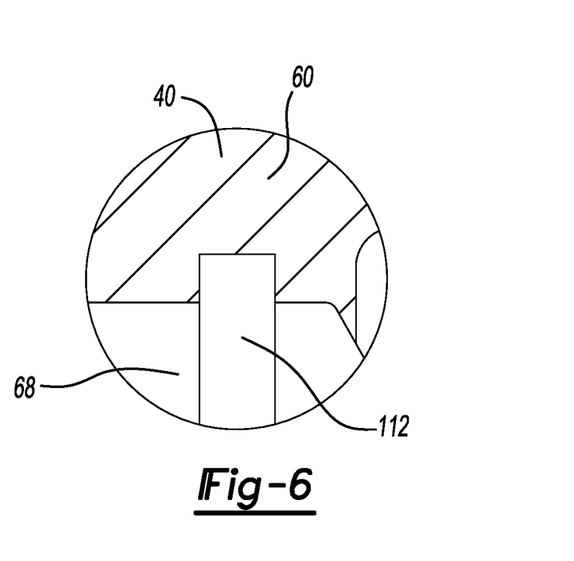

Returning to FIG. 1, the first shaft bearing 16 can be received in the first bearing seat 68 in the first body 60 of the rear bearing housing 40 and can be received on the first cylindrical portion 32 of the base shaft 12. A first snap ring 110 can be received into a first snap ring groove 112 (FIGS. 3 & 6) formed in the first body 60 and can trap the first shaft bearing 16 in the first bearing seat 68.

The second shaft bearing 18 can be received in the second bearing seat 88 in the second body 80 of the front bearing housing 42 and can be received on the second cylindrical portion 34 of the base shaft 12. A second snap ring 120 can be received into a second snap ring groove 122 (FIG. 8) formed in the second body 80 and can trap the second shaft bearing 18 in the second bearing seat 88. It will be appreciated that the second shaft bearing 18 and the second snap ring 120 may need to be assembled to the input shaft 14 prior to the first shaft bearing 16 and the first snap ring 110.

Figure 4:
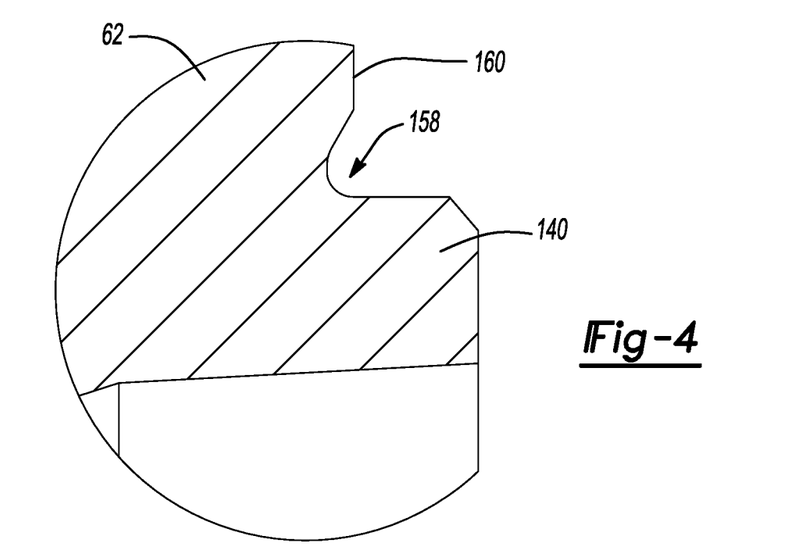
FIGS. 4 through 6 are enlarged portions of FIG. 3.
Figure 12:
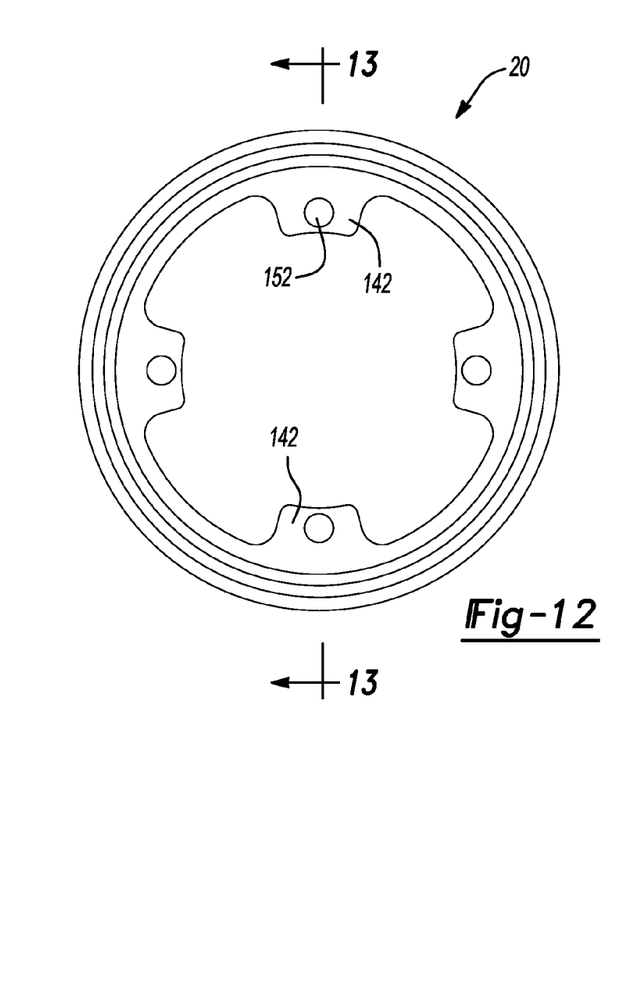
FIG. 12 is an end view of a portion of the fan drive hub assembly of FIG. 1, illustrating an input member in more detail.
Figure 13:
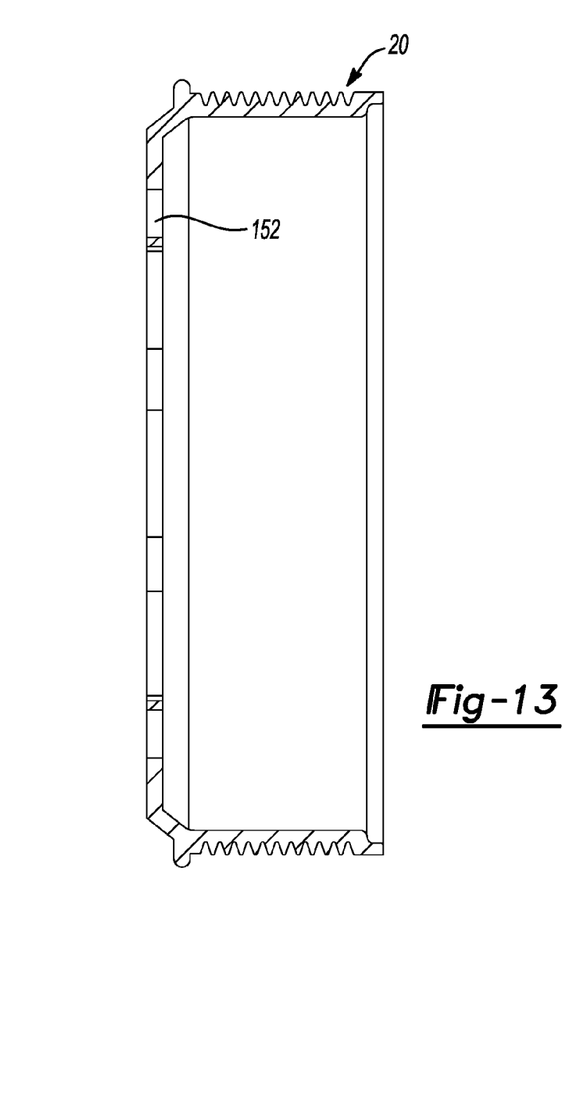
FIG. 13 is a section view taken along the line 13-13 of FIG. 12.

With reference to FIGS. 1, 12 and 13, the input member 20 can be any type of structure that can be configured to transmit rotary power into the input shaft 14. In the particular example provided, the input member 20 is a pulley that is configured to receive power from a belt (not shown), but it will be appreciated that the input member 20 could be a sprocket or a gear, for example. The input member 20 and the rear bearing housing 40 can have one or more features that can be employed to locate their rotational axes in a coincident manner. In the example provided, the rear bearing housing 40 comprises a pilot portion 140 (FIGS. 3 & 4) that is configured to engage one or more centering features 142 on the input member 20. In the example provided, the pilot portion 140 (FIGS. 3 & 4) is an annular rib that engages a radially inward face of the centering features 142, but it will be appreciated that other techniques, including pins, could be used to locate the input member 20 relative to the input shaft 14. Any desired means can be employed to fixedly couple the input member 20 to the input shaft 14 to form an input shaft assembly. In the particular example provided, a plurality of threaded fasteners 150 are received through corresponding holes 152 formed in the input member 20 and threaded into threaded holes 156 (FIG. 3) in the first flange 62 in the rear bearing housing 40. An undercut radius 158 (FIG. 4) could be formed in the first flange 62 between the pilot portion 140 and a flange face 160 (FIG. 4) against which the input member 20 abuts. It will be appreciated that the input member 20 and the rear bearing housing 40 can be coupled in various different ways, or that the input member 20 and the rear bearing housing 40 could be unitarily and integrally formed.

The clutch 22 and the output member 24 can be conventional in their construction and operation and as such, a detailed discussion of these components is not needed herein. Briefly, the clutch 22 can be any type of clutch, such as an on/off clutch, a bi-metal viscous clutch or a vistronic (electronically controlled) clutch, and can include a clutch input member 20, which is coupled to the front bearing housing 42 for common rotation, a clutch output member (not shown), which is coupled to the output member 24 for common rotation, and a clutch mechanism (not specifically shown) that is selectively operable for transmitting rotary power between the clutch input member 20 and the clutch output member. In the particular example provided, the clutch output member is the output member 24 and is adapted to be coupled to a fan (not shown) in a manner that is conventional and well known in the art.

Construction of the fan drive hub assembly 10 in the manner described produces an input shaft that is relatively lower in weight than a similar fan drive hub assembly having an input shaft that is cast of grey iron and machined. Additionally, various components of the input shaft, such as the front bearing housing 42, can be common to a family of different sized fan drive hub assemblies and differences in the axial length of the input shaft can be accommodated by couplers 44 of different lengths. Moreover the input shaft easily accommodates different input members, thereby permitting the use of certain designs (e.g., a spun pulley design) for relatively high volume applications and other designs (e.g., a cast poly-V pulley that can be integrally and unitarily formed onto the rear bearing housing) for relatively low volume applications.

Figure 15:
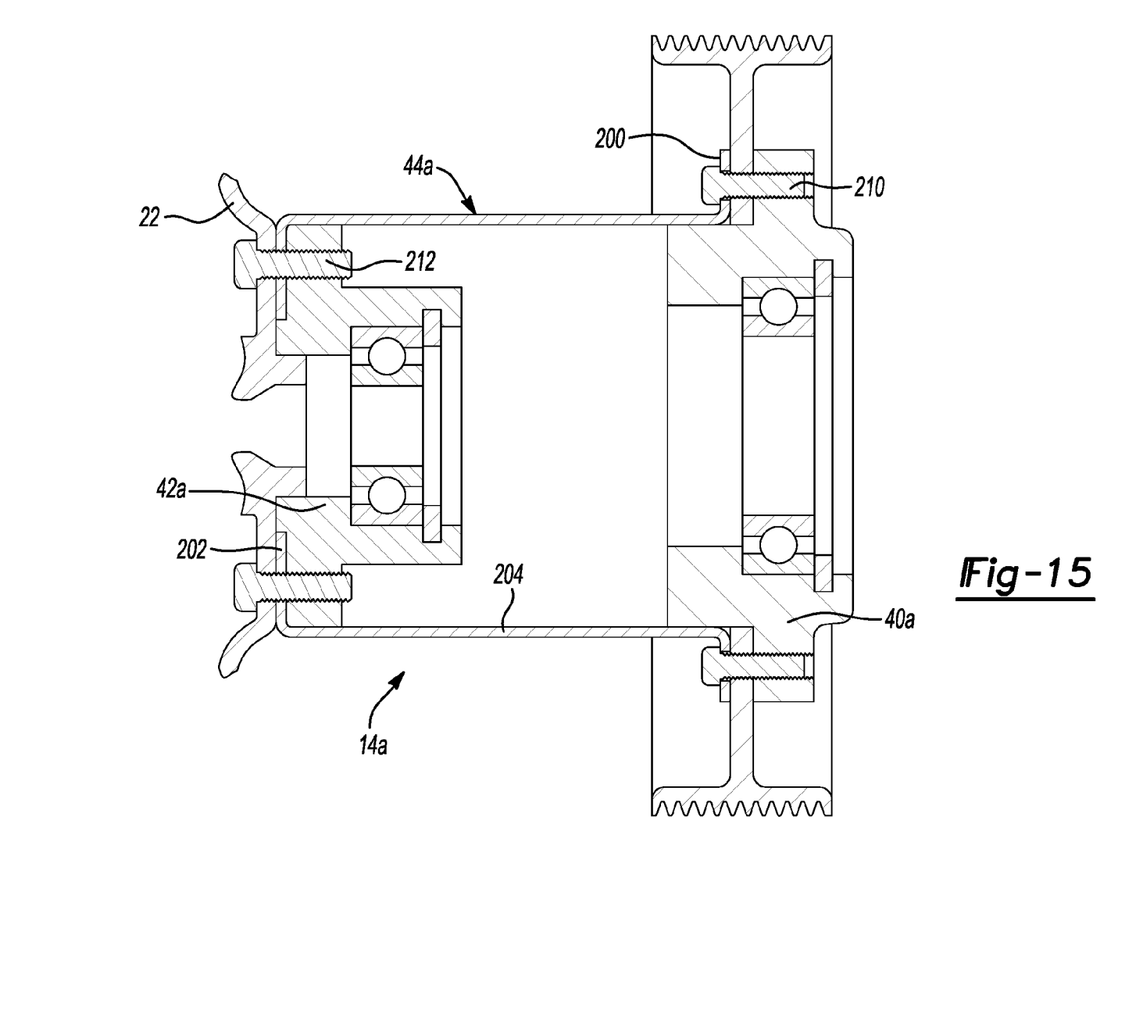
FIGS. 15 and 16 are section views of portions of two other fan drive hub assemblies constructed in accordance with the teachings of the present disclosure.

The example of FIG. 15 is generally similar to the previous embodiment except that the coupler 44*a* of the input shaft 14*a* is formed with first and second coupler flanges 200, 202 that extend radially from a generally tubular coupler body 204. Rather than being threaded to the rear and front bearing housings 40*a* and 42*a*, a set of first threaded fasteners 210 and a set of second threaded fasteners 212 are employed to fixedly couple the coupler 44*a* to the rear and front bearing housings 40*a* and 42*a*, respectively. It will be appreciated that as in the example of the previous embodiment, the fasteners that comprise the second set of threaded fasteners 212 in the current example are employed to fixedly couple the front bearing housing to an input member of the clutch 22.

Figure 16:
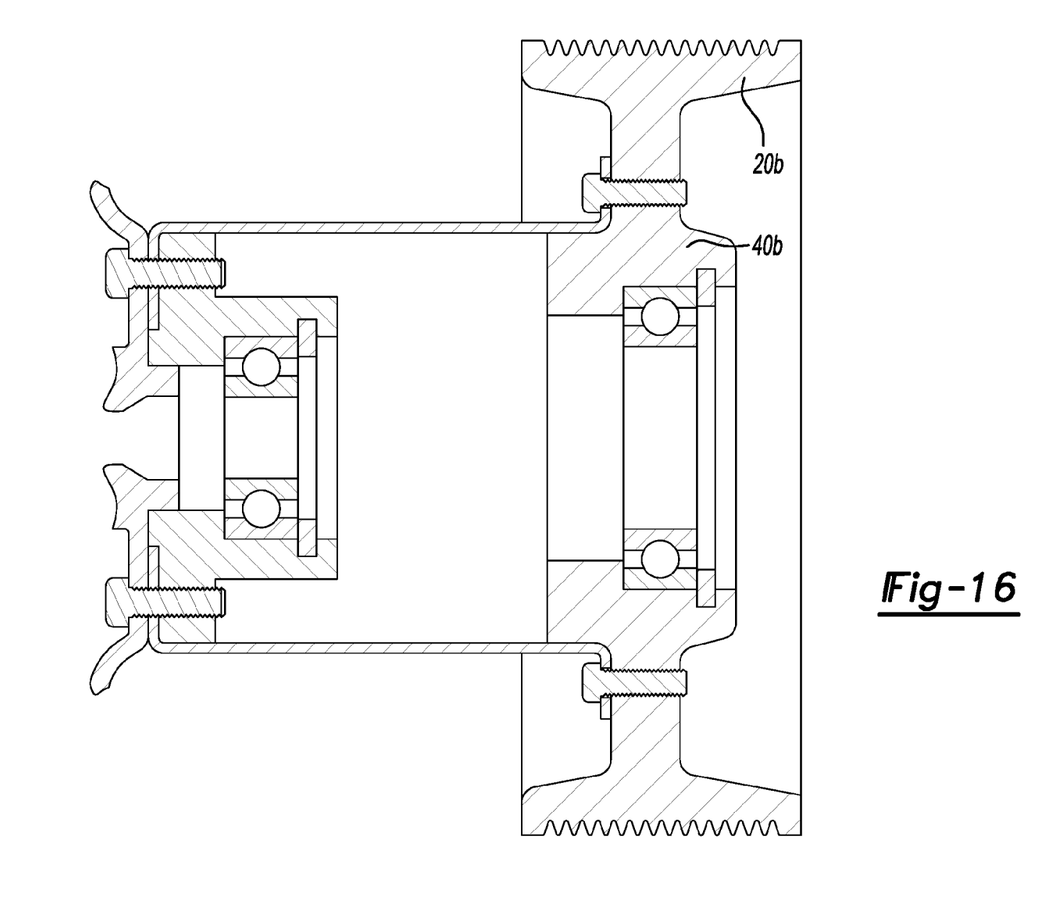

The example of FIG. 16 is generally similar to the example of FIG. 15, except that the input member 20b and the rear bearing housing 40b are unitarily and integrally formed.

Figure 17:
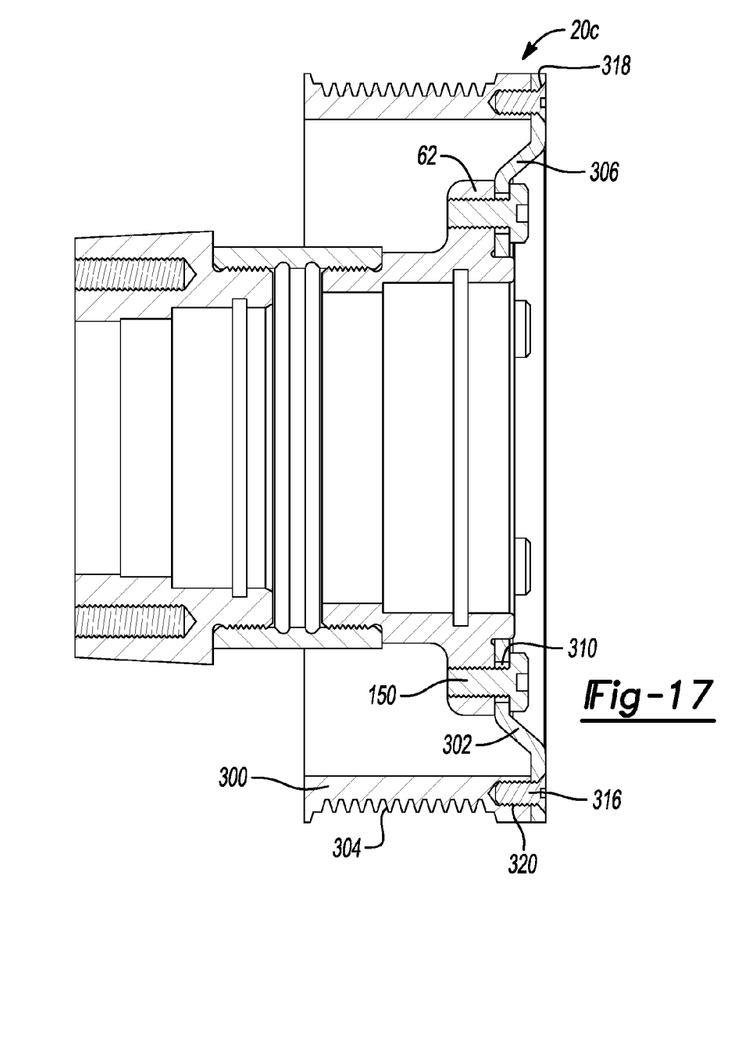
FIG. 17 is a section view that illustrates an alternative constructed pulley mounted to the input shaft that is depicted in FIG. 1.

In some instances, it may be advantageous to form the pulley as an assembly or weldment from a plurality of discrete components. With reference to FIG. 17 for example, the pulley 20c could comprise a belt drive portion 300 and a mounting flange 302. The belt drive portion 300 could be formed from a suitable material, such as a steel tube material, and can be machined as needed to have a desired belt engagement profile 304 and size. The mounting flange 302 can be machined from an appropriate plate stock material, such as 9 gauge cold-rolled steel, in a desired machining operation, such as stamping, fine blanking, or laser cutting for example. The mounting flange 302 can define a hub 306 that is configured to be mounted to the first flange 62 and as such, can define a plurality of apertures 310 through which the threaded fasteners 150 can be received. The mounting flange 302 can be fixedly coupled to the belt drive portion 300 via any desired fastening technique. In the example provided, a plurality of threaded fasteners 316 are received through through-holes 318 in the mounting flange 302 and are threadably received into corresponding threaded apertures 320 formed in an axial end of the belt engagement portion 300. It will be appreciated, however, that any other desired fastening technique(s), such as welding, rivets, threads, and/or an interference fit, could be used in addition to or in lieu of the threaded fasteners 316.

Figure 18:
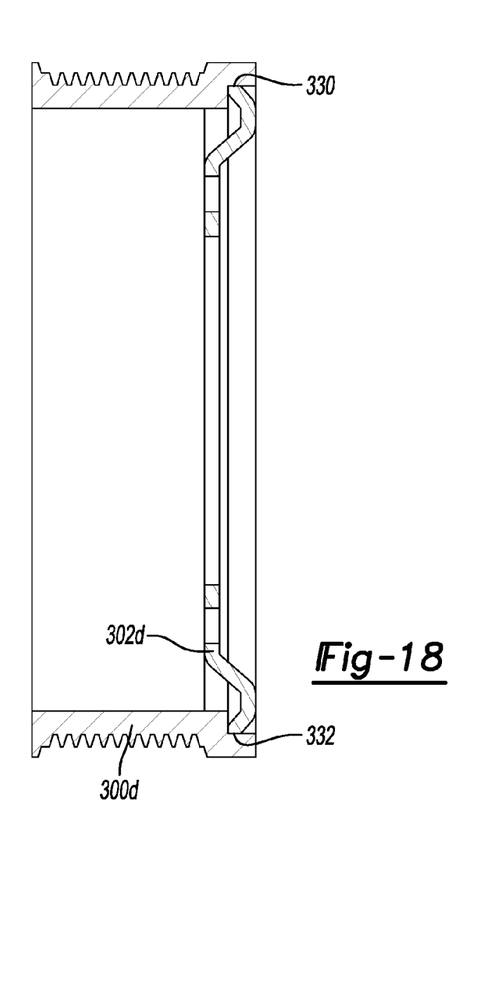
FIG. 18 is a section view of another alternative pulley configuration.

In the example of FIG. 18, the mounting flange 302d defines an outer peripheral rim 330 that is received into a counterbore 332 formed into the belt drive portion 300d and a weld, such as a MIG weld, is employed to secure the outer peripheral rim 330 to the belt drive portion 300d.

Figure 19:
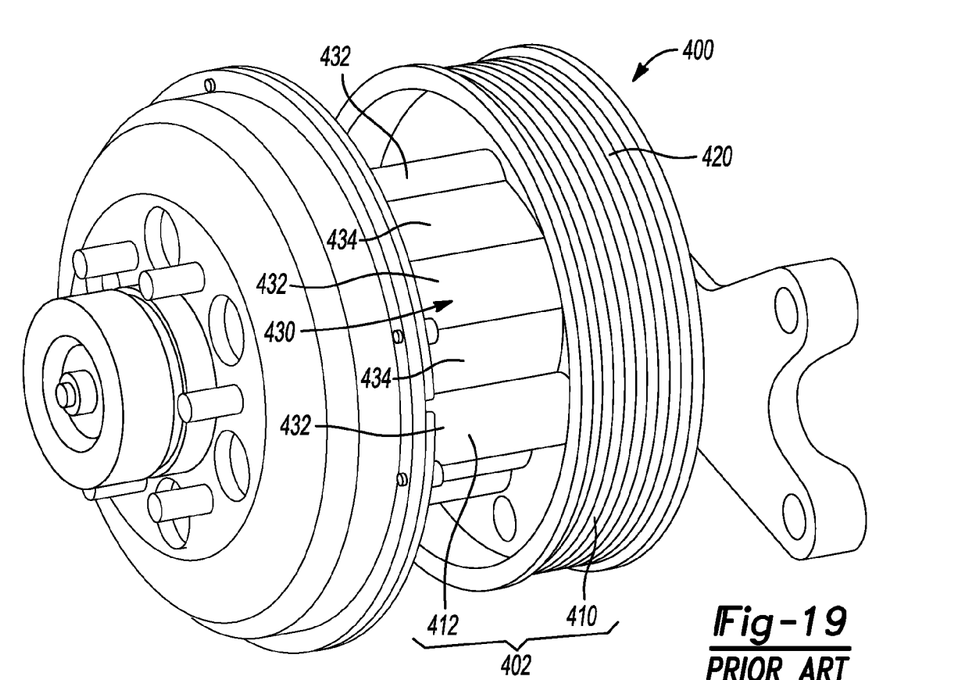
FIG. 19 is a perspective view of a prior art fan clutch.

In the example of FIG. 19, a prior art fan clutch assembly 400 is illustrated to include a unitized pulley and input shaft 402 that is unitarily formed (i.e., cast) of grey iron. The unitized pulley and input shaft 402 includes a pulley portion 410 and an input shaft portion 412. The pulley portion 410 is machined on its outer periphery to size and contour a belt engagement profile 420. The input shaft portion 412 has a first end, which is integrally formed with (and therefore fixedly coupled to) the pulley portion 410. A second axial end (not shown), as well as at least a portion of the several internal surfaces of the input shaft portion 412 are machined to size the various internal surfaces of the input shaft portion 412 in a desired manner. The exterior peripheral surface 430 of the input shaft portion 412, however, is not machined and includes a plurality of circumferentially spaced apart semi-cylindrical segments 432. Each of the semi-cylindrical segments 432 accommodates a threaded aperture (not specifically shown) into which a threaded fastener (not shown) is received to secure the input shaft 402 to an inner clutch housing (not shown). The contouring of the exterior peripheral surface 430 of the input shaft portion 412 provides desired strength (in the area about the threaded fasteners that secure the input shaft 402 to the inner clutch housing) while reducing the weight of the input shaft 402 by the use of pockets 434 between the semi-cylindrical segments 432. It will be appreciated that the presence of a pocket 434 essentially eliminates material from the input shaft that would otherwise be present (and filling in the volume between adjacent semi-cylindrical segments 432).

Figure 20:
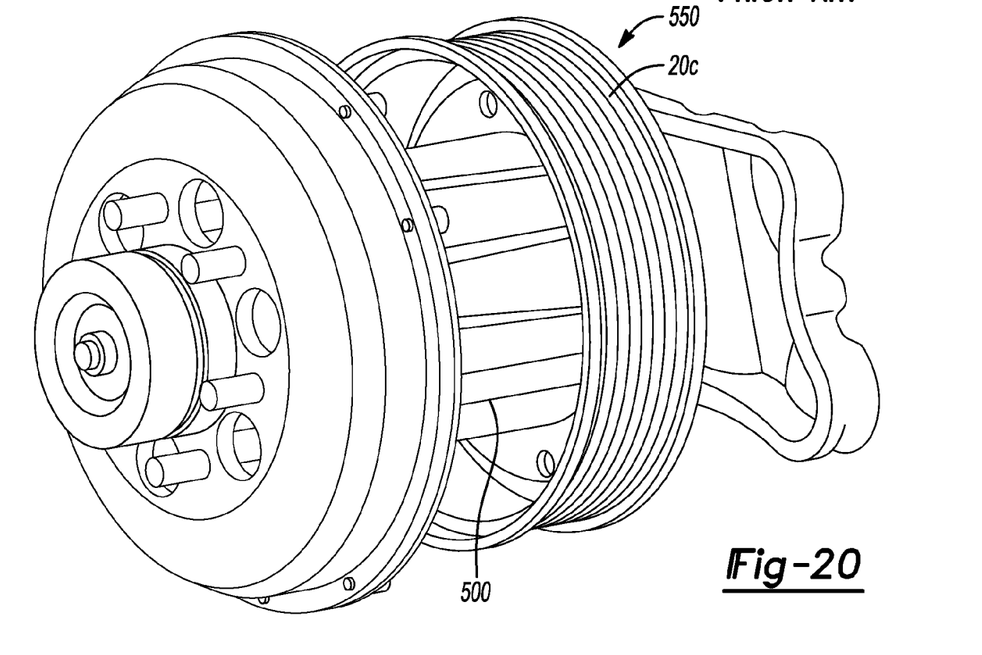
FIG. 20 is a perspective view of a fan clutch constructed in accordance with the teachings of the present disclosure.
Figure 21:
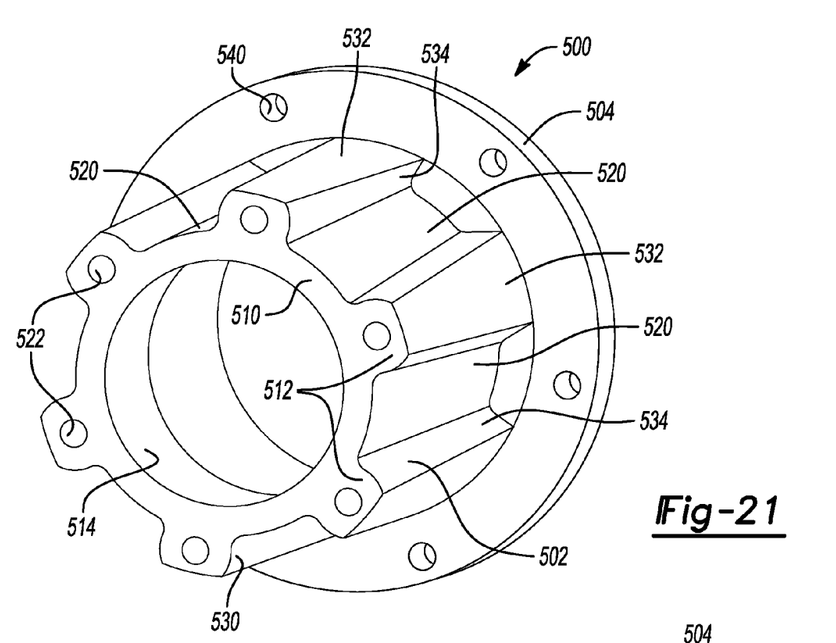
FIG. 21 is a perspective view of a portion of the fan clutch of FIG. 20, illustrating an input shaft in more detail.
Figure 22:
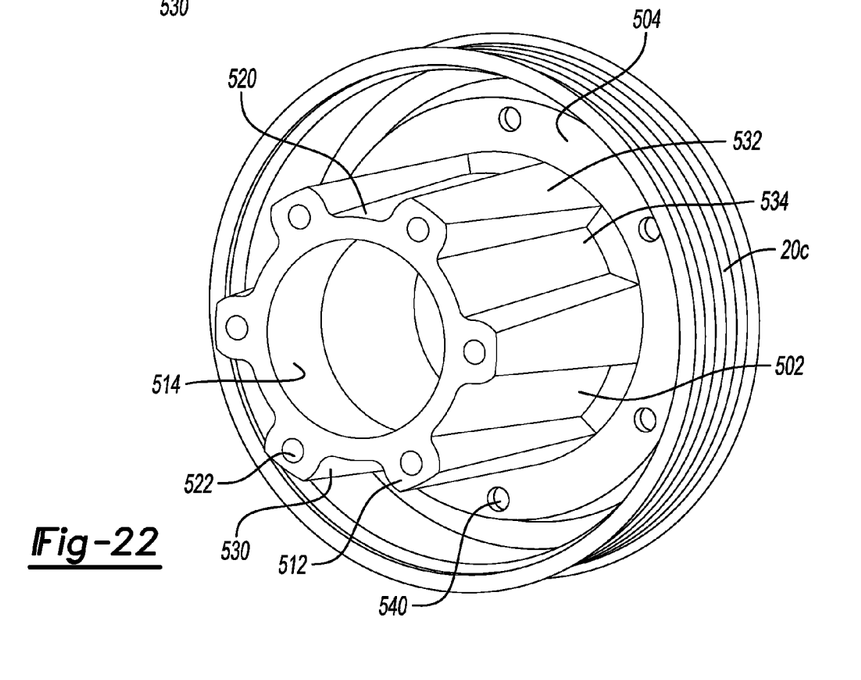
FIG. 22 is a perspective view of a portion of the fan clutch of FIG. 20, illustrating the input shaft and a pulley.

The example of FIG. 20, however, obtains further weight reductions through the use of the pulley 20c and a lighter weight input shaft 500. With reference to FIGS. 21 and 22, the input shaft 500 includes a shaft portion 502 and a flange portion 504 that is integrally and unitarily formed (e.g., through casting) with the shaft portion 502. The shaft portion 502 defines an annular wall 510 and a plurality of bosses 512. The inside surface(s) 514 of the annular wall 510 can be fully machined so that no portion of the inside surface(s) 514 are "as cast". The bosses 512 are fixedly coupled to the exterior side of the annular wall 510 and are circumferentially spaced apart to define a plurality of pockets 520. A threaded aperture 522 is formed in each of the bosses 512. The exterior surface 530 of the shaft portion 502 includes a machined surface portion 532 and an as-cast portion 534. The machined surface portion 532 is cylindrically shaped and intersects the plurality of bosses 512 radially outwardly of the threaded apertures 522. The as-cast portion 534 includes the portions of the bosses 512 that are not machined, as well as the surface of the pockets 520. The flange portion 504 can extend radially outwardly from an axial end of the shaft portion 502 and can define a plurality of threaded through-holes 540 that are configured to threadably receive fasteners (not shown) that are employed to secure the pulley 20c to the flange portion 504.

Construction of the fan clutch assembly 550 (FIG. 20) with the pulley 20c and the input shaft 500 (instead of the unitized pulley and input shaft 402 of FIG. 19) facilitates a significant reduction in the mass of the fan clutch assembly 550 (FIG. 20). Additionally, the machining of the input shaft 500 prior to its assembly to the pulley 20c greatly reduces (and potentially eliminates) the need for rotationally balancing the assembly (of the input shaft 500 and the pulley 20c). Due to the reduced need for rotationally balancing the assembly, various portions of the assembly, such as the thickness of the annular wall 510 of the shaft portion 502, can be reduced relative to the thickness of the annular wall (not specifically shown) in the prior art unitized pulley and input shaft 402 (FIG. 19).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fan drive hub assembly comprising:
   an output member;
   an input shaft;
   a clutch that selectively transmits rotary power between the input shaft and the output member;
   an input member coupled to the input shaft for common rotation;
   a base shaft received in the input shaft; and
   first and second shaft bearings that support the input shaft for rotation on the base shaft;
   wherein the input shaft comprises a rear bearing housing, a front bearing housing and a coupler, the rear bearing housing having a first body and a first flange that extends radially outwardly from the first body, the first body being a tubular structure that defines a first bearing seat, which receives the first shaft bearing, a first threaded portion, and a first shoulder, the first threaded portion being formed on an axial end of the first body, the input member being fixedly coupled to the first flange, the front bearing housing having a second body and a second flange that extends radially outwardly from the second body, the second body being a tubular structure that defines a second bearing seat, which receives the second shaft bearing, a second threaded portion, and a second shoulder, the second threaded portion being formed on an axial end of the second body, an input of the clutch being coupled to the second flange for common rotation, the coupler being a tubular structure having third and fourth threaded portions and first and second abutment faces, the third threaded portion being threadably engaged to the first threaded portion, the fourth threaded portion being threadably engaged to the second threaded portion, the first abutment face being abutted against the first shoulder, the second abutment face being abutted against the second shoulder.

2. The fan drive hub assembly of claim 1, wherein the first threaded portion comprises external threads.

3. The fan drive hub assembly of claim 1, wherein the second threaded portion comprises external threads.

4. The fan drive hub assembly of claim 1, further comprising a first snap ring that is received in a first groove formed into one of the rear and front bearing housings, the first snap ring abutting an associated one of the first and second shaft bearings.

5. The fan drive hub assembly of claim 4, further comprising a second snap ring that is received into a second groove formed into the other one of the rear and front bearing housings, the second snap ring abutting a corresponding one of the first and second shaft bearings.

6. The fan drive hub assembly of claim 1, wherein the first threaded portion comprises buttress threads.

7. The fan drive hub assembly of claim 1, wherein the second threaded portion comprises buttress threads.

8. A fan drive hub assembly comprising:
an output member;
an input shaft;
a clutch that selectively transmits rotary power between the input shaft and the output member;
an input member coupled to the input shaft for common rotation;
a base shaft received in the input shaft; and
first and second shaft bearings that support the input shaft for rotation on the base shaft;
wherein the input shaft comprises a rear bearing housing, a front bearing housing and a coupler, the rear bearing housing having a first body and a first flange that extends radially outwardly from the first body, the first body being a tubular structure that defines a first bearing seat, which receives the first shaft bearing, and a first coupling section, the input member being fixedly coupled to the first flange, the front bearing housing having a second body and a second flange that extends radially outwardly from the second body, the second body being a tubular structure that defines a second bearing seat, which receives the second shaft bearing, and a second coupling section, an input of the clutch being coupled to the second flange for common rotation, the coupler being a tubular structure having third and fourth coupling sections that are fixedly coupled to the first and second coupling sections, respectively.

9. The fan drive hub assembly of claim 8, wherein at least one of the first and second coupling sections is threaded.

10. The fan drive hub assembly of claim 8, wherein the first coupling section is welded to the third coupling section and/or the second coupling section is welded to the fourth coupling section.

11. The fan drive hub assembly of claim 8, wherein the first coupling section is fastened to the third coupling section and/or the second coupling section is fastened to the fourth coupling section.

* * * * *